Oct. 22, 1963  M. C. MAUGH  3,107,744
COMBINATION FLUID PRESSURE CONTROL AND GAUGE
Filed March 14, 1960
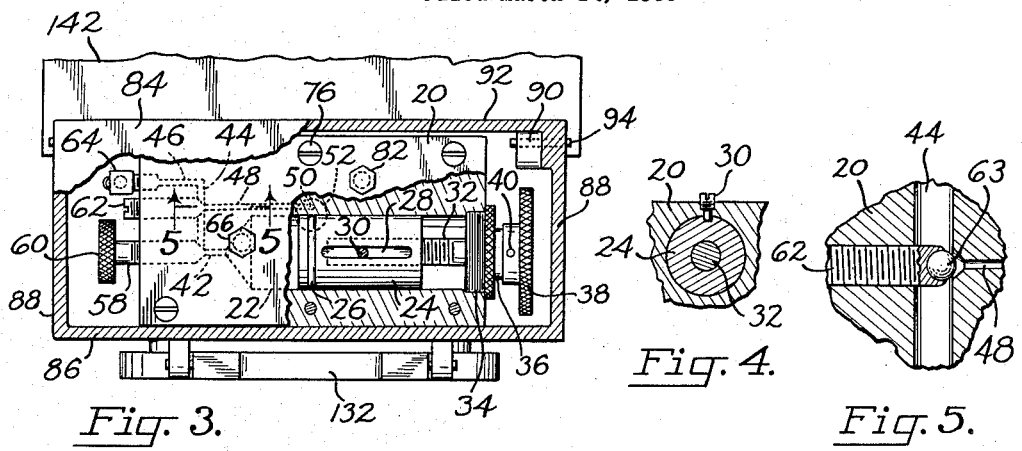
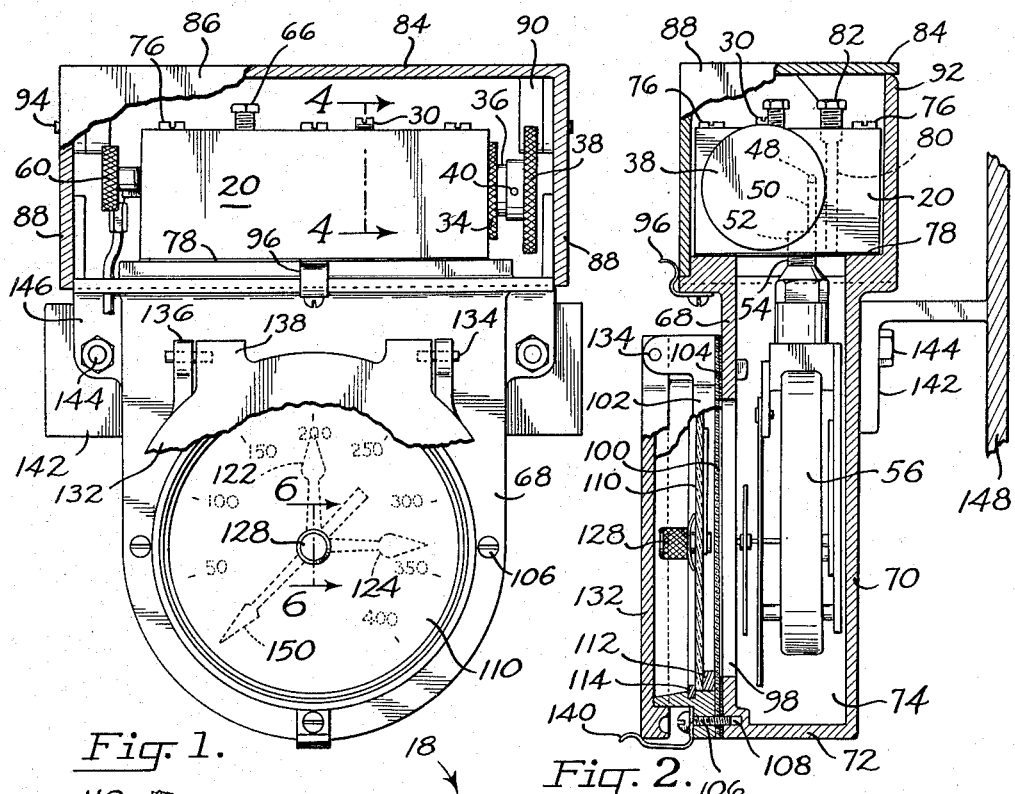
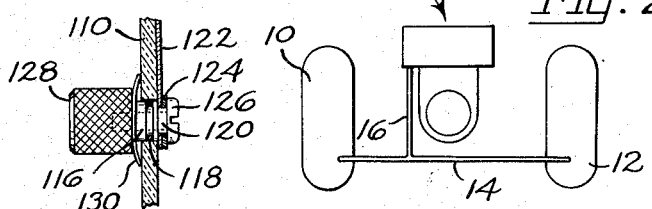
Murrel C. Maugh
INVENTOR.
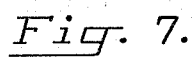
Agent

United States Patent Office 3,107,744
Patented Oct. 22, 1963

3,107,744
COMBINATION FLUID PRESSURE CONTROL
AND GAUGE
Murrel C. Maugh, 2537 Wood Ave., Eugene, Oreg.
Filed Mar. 14, 1960, Ser. No. 14,937
3 Claims. (Cl. 177—209)

This invention pertains to fluid pressure control systems, and relates particularly to a compact and unitary construction of a combination fluid pressure control and gauge.

There are many types of fluid pressure systems in which it is desirable to be able to adjust and measure fluid pressures simultaneously. Illustrative of such types of fluid pressure systems is my load-weighing device, described in Reissue Patent No. 24,200 and described briefly hereinafter. Conventional fluid pressure systems are constructed by the interconnection of fluid pressure conduits with various types of fittings, valves and gauges, as a system of plumbing. Such arrangements generally are satisfactory for stationary systems, although the time required for such assembly represents a substantial portion of the cost of such systems. On the other hand, conventional plumbing systems are not satisfactory when they are to be installed upon moving objects, such as the installation of my load-weighing device upon a logging truck or other vehicle. In such instances the conventional plumbing systems are subject to vibration and other forces, resulting in leakage of the fluid pressure system. Moreover, such conventional plumbing systems require considerable time for installation upon a logging truck or other vehicle, and the parts thereof are exposed to damage by flying objects and general deterioration due to exposure to the elements of weather.

It is a principal object of the present invention to provide a combination fluid pressure control and gauge in the form of a compact unitary assembly, with all of the control system contained in a single block.

Another important object of this invention is to provide a unitary fluid pressure control and gauge system confined within a single block and including a fluid pressure pump also formed within the block.

Still another important object of the present invention is to provide a combination fluid pressure control and gauge in which the control assembly is contained within a single block and wherein said block functions additionally as a sealing cap for an oil filled casing for the gauge.

A further important object of the present invention is the provision of a gauge casing having a viewing lens and means for mounting in said viewing lens an adjustable reference dial hand while maintaining the gauge casing sealed.

The foregoing and other objects and advantages of the present invention will appear from the following detailed descritpion, taken in connection with the accompanying drawing, in which:

FIG. 1 is a view in front elevation of a combination fluid pressure control and gauge embodying features of this invention, portions thereof being broken away to disclose details of construction;

FIG. 2 is a view in side elevation of the assembly shown in FIG. 1, portions being broken away to disclose construction details;

FIG. 3 is a plan view of the assembly shown in FIG. 1, with portions broken away to disclose details of internal construction;

FIG. 4 is a fragmentary sectional view taken along the line 4—4 in FIG. 1 and showing details of construction of the fluid pressure pump component of the assembly;

FIG. 5 is a fragmentary sectional view taken along the line 5—5 in FIG. 3 and showing a preferred valve construction;

FIG. 6 is a fragmentary sectional view taken along the line 6—6 in FIG. 1 and showing details of construction of the sealing mount for the reference dial hand; and FIG. 7 is a schematic representation of the combination fluid pressure control and gauge of this invention in association with a load-weighing scale system.

Although the fluid pressure control and gauge assembly of this invention may be utilized to advantage in many fluid pressure systems, it has particular utility in the load-weighing scale system referred to hereinbefore and illustrated schematically in FIG. 7. Therein is shown a pair of scale pads 10, 12 each having an internal fluid-containing chamber, the chambers being interconnected by the fluid pressure conduit 14 which communicates through the conduit 16 to the combination fluid pressure control and gauge assembly 18 of this invention.

The fluid pressure control of this invention is confined in a single block 20 of metal. Formed within the block is a longitudinal bore 22 defining a fluid pressure pump cylinder. This bore opens onto one end of the block and slidably receives therein the fluid pressure pump piston 24. The piston is provided adjacent its inner end with a peripheral groove which receives the O-ring seal 26, which functions to prevent leakage of hydraulic fluid from the inner end of the bore toward the outer end of the piston.

In the embodiment illustrated, the piston is provided with a longitudinal guide groove 28 in its surface outwardly from the O-ring seal. A removable guide screw 30 is supported in a tapped opening in a block for registry at its inner end in the guide groove, thus restraining the piston against axial rotation while permitting its longitudinal movement through the bore. A threaded piston control rod 32 is received in a threaded bore in the piston and its outer end is reduced in diameter to receive the assembly of the locking sleeve 34, the dust seal 36 and the control knob 38. The locking sleeve is threaded externally for removable reception in the threaded outer portion of the bore, and the control knob is secured to the rod by such means as the set screw 40. Thus, the rod is confined against longitudinal displacement relative to the locking sleeve, whereupon rotation of the control knob effects longitudinal movement of the piston in the cylinder bore.

The inner end of the cylinder bore communicates through the longitudinal port 42 with the transverse port 44. This latter port communicates, in turn, with the longitudinal outlet port 46 and with the longitudinal gauge inlet port 48. The interconnecting port 44 is provided conveniently by drilling into the block from the front or back side and thereafter plugging the outer end. The gauge inlet port also communicates through the smaller vertical port 50 with the enlarged vertical port 52 which is threaded internally to receive the externally threaded inlet connection 54 to the fluid pressure gauge 56. The gauge may be of the Bourdon tube type or any other conventional type which functions upon change of fluid pressure to operate a pressure indicator.

An adjustable shut-off valve is associated with the cylinder outlet port 42 and, in the embodiment illustrated, this is provided by the externally threaded needle valve 58 receivable in a threaded bore which is aligned coaxially with the port 42. A control knob 60 is provided on the outer end of the needle valve for operating the latter.

A dampening valve is associated with the gauge inlet port 48, for adjusting the inlet to the latter and thus reducing to a minimum the fluctuations of fluid pressure which might occur in the outlet system. In the embodiment illustrated, this dampener valve is provided by the externally threaded needle valve 62 which is received in a threaded bore provided in the block coaxial with the gauge inlet port 48. The outer end of the needle valve is provided with a screw driver slot by which to facilitate adjustment of the valve.

In the preferred embodiment illustrated, and best shown in FIG. 5, the needle of each of the valves 58 and 62 is provided by a ball 63 which is secured in a pocket in the end of the valve stem and which seats removably in a socket formed at the adjacent end of the associated port. The socket preferably is formed in the cross sectional shape of a truncated cone or spherical segment.

The outlet port 46 communicates with an outlet fitting 64 which is removably secured in a threaded bore provided in the block coaxial with the outlet port. This outlet fitting communicates with the fluid pressure system to be controlled which, in the illustration shown in FIG. 7, is the assembly of the pair of fluid pressure scale pads.

A tapped opening is provided in the block for communication with the inner end of the cylinder bore, for purposes of filling the latter with hydraulic fluid. A fill plug 66 is provided for closing this opening.

Although the control and gauge assembly may be utilized in the form described hereinbefore, it is desirable for many purposes to enclose the gauge in a casing to protect the gauge from damage and contamination. In other instances it may be desirable to confine the gauge within a fluid-tight casing filled with oil, to maintain the working parts of the gauge lubricated and to absorb shock and vibrations.

Accordingly, a casing is provided which, as best illustrated in FIG. 2 of the drawing, includes front wall 68, rear wall 70 and side wall 72 defining a compartment 74 which receives the gauge 56 suspended from the block 20. The plane upper surface of the casing defining the top of the compartment functions as a support for the block which is secured thereto by means of the screws 76.

The block is larger in dimension than the opening to the compartment, thereby forming a cover for the latter. A sealing gasket 78 may be interposed between the block and underlying support to provide a liquid tight seal in the event the compartment is to be filled with oil. For purposes of filling the compartment with oil, a vertical bore 80 is provided through the block to communicate at its lower end with the compartment. The upper end of the bore is tapped to receive the fill plug 82. It is desirable to maintain an air space below the fill plug to accommodate expansion of the oil with increase in temperature.

The block 20 and associated valve controls are enclosed by a pivoted cover which includes a top wall 84, a front wall 86 and side walls 88. The cover is mounted pivotally on the lugs 90 projecting inwardly from the extension 92 of the back wall 70 of the casing, by means of the pivot pins 94, and the cover is retained in closed position by means of a spring clip 96 which is secured to the casing.

The front wall 68 of the compartment casing is provided with an enlarged opening 98 through which to view the gauge dial. This opening is covered by a transparent lens 100 which is interposed between the front wall of the casing and a retaining lens collar 102. A sealing gasket 104 is interposed between the front wall of the casing and the lens 100 to provide a fluid tight seal against the escape of oil within the compartment. The assembly of retaining collar, lens and sealing gasket is secured firmly to the casing by means of screws 106 which extend through aligned openings in the elements for threaded engagement with the tapped sockets 108 provided in the casing.

For some purposes it is desirable to provide the fluid pressure control and gauge assembly of this invention with indicating means for establishing an operating range of fluid pressures. For example, referring to FIG. 7 of the drawing and to my patent referred to hereinbefore, my load-weighing scale system requires an initial prepressurization of the fluid in the scale system in order to achieve accuracy of load readings. Moreover, most load carrying vehicles are limited to a maximum load weight. Accordingly, it is desirable in this instance to establish the relationship between the gauge dial readings at the points of initial prepressurization and maximum load weight, respectively.

In the embodiment illustrated in the drawing, the foregoing range indicator is provided by means of an auxiliary transparent lens 110 which is supported removably within the collar 102 between the resilient spacer ring 112, which freely abuts the main lens 100, and the split retainer ring 114 which is mounted removably in an annular groove in the collar. A central opening in the auxiliary lens (FIG. 6) receives freely therethrough the intermediate section 116 of the hand post. This section is provided with an annular groove which supports a resilient O-ring 118, the latter providing a fluid-tight seal between the auxiliary lens and the post.

The inner section 120 of the post is reduced in diameter to receive freely thereon the apertured ends of the range indicator hands 122, 124. These hands are retained on the inner section of the post by means of the headed screw 126 which is received in the tapped longitudinal bore of the post. The length of the inner end section of the post is slightly less than the combined thicknesses of the hands, whereby the latter are retained securely in adjusted position when the screw is tightened sufficiently to clamp the hands between the screw head and the shoulder formed at the junction of the intermediate and inner end sections of the post.

The outer end section of the post is enlarged and preferably knurled to provide a hand knob 128 by which to manipulate the range indicator hands. A spring washer 130 preferably is interposed between the knob and lens to provide a sufficient degree of friction to retain the range indicator hands in adjusted position.

Since the O-ring 118 provides an effective seal against the escape of liquid between the lens and post, it will be apparent that the auxiliary lens 110 may be omitted and the range indicator hand and post assembly mounted directly on the main lens 100. However, the arrangement illustrated is preferred since it accommodates ready removal of the auxiliary lens for readjusting the range hands, without disturbing the liquid seal of oil within the compartment 74. In addition, this arrangement protects the main lens against damage and scarring, the auxiliary lens being readily replaceable when it has been scarred beyond use. In this regard, it is preferred that the lenses be made of synthetic thermoplastic material.

A protective cover 132 is mounted pivotally on the collar 102 by means of the pivot pins 134 which interconnect the projecting tabs 136, 138 on the collar and cover, respectively. The cover is retained in closed position by means of the spring clip 140 which is secured under the head of the collar mounting screw 106.

The portion of the collar forwardly of the ring 114 projects beyond the knob 128 to protect the latter and the lens. The cover 132 closes against the collar rim.

Various means may be provided for mounting the casing upon a support. In the embodiment illustrated, a length of angle iron 142 is secured to the casing by means of the bolts 144 which extend through aligned openings in the angle iron and the laterally projecting ears 146 on the casing. The angle iron then may be secured to a supporting structure, for example by welding the rearward edge of the angle iron to a metal support.

The operation of the combined fluid pressure control and gauge system disclosed hereinbefore, now will be described with reference to the load-weighing scale system illustrated schematically in FIG. 7. With the outlet fitting 64 connected to the conduit 16 leading to the pair of scale pads 10, 12 and the entire system filled with hydraulic fluid at atmospheric pressure, the pump cylinder shut-off valve 58 is opened and the dampener valve 62 adjusted preferably to the point at which the flow of hydraulic fluid to the gauge 56 is much less than the flow of hydraulic fluid between the pump cylinder 22 and the outlet port 46.

Let it now be assumed that proper operation of the scale system requires initial prepressurization to 200 pounds per square inch gauge. Accordingly, the piston control knob 38 is rotated in the direction to force the piston 24 toward the left (FIG. 3), whereby to force hydraulic fluid through the outlet port and into the scale system. When the gauge hand 150 reaches the dial marking of 200 p.s.i. the shut-off valve 58 is closed to seal the scale and gauge system from the hydraulic pump.

Let it be assumed further that the maximum load permitted to be carried by the vehicle is equivalent to a gauge reading of 130 p.s.i. The auxiliary lens 110 is removed from the collar 102, by removing the retaining keeper ring 114, the post screw 126 is loosened and the range indicator hands 122, 124 are spaced apart radially a distance equal to 130 p.s.i. on the gauge dial. The post screw then is tightened to secure the range hands in the adjusted position, and the auxiliary lens reinstalled upon the collar. The post knob 128 then is rotated until the range hand 122, which trails in the clockwise direction, is aligned with the 200 p.s.i. markings on the gauge dial. Thus, the scale system is in readiness to weigh the load to be applied to the vehicle, and when the gauge hand 150 moves clockwise into registry with the leading range hand 124, the vehicle will have been loaded to its maximum allowable capacity.

During subsequent uses of the scale system on the vehicle, variations in atmospheric temperature may effect a change of initial fluid prepressure from the desired 200 p.s.i. Correction may be made simply by lifting the protective covers to expose the control block 20 and gauge dial, opening the shut-off valve 58 and turning the pump control knob 38 in the proper direction to return the gauge dial hand 150 to the dial marking of 200 p.s.i. and thereafter closing the shut-off valve 58.

From the foregoing it will be apparent that the present invention provides a combination fluid pressure control and gauge assembly which is of extremely compact design for most efficient utilization. Its rugged construction permits its use under the most abusive conditions, such as are encountered when it is employed in a scale system mounted upon a logging truck or trailer. The integration of the control valves and hydraulic pump into a single metal block assures maximum efficiency of operation with a minimum of maintenance and repair.

It will be apparent to those skilled in the art that various changes in the details of construction described hereinbefore may be made without departing from the spirit of this invention and the scope of the appended claims.

Having now described my invention and the manner in which it may be used, what I claim as new and desire to secure by Letters Patent is:

1. For use with a fluid pressure load-weighing device, a combination fluid pressure control and gauge assembly comprising a block having therein a pump cylinder bore slidably receiving a pump piston, adjustable control means on the block engaging the piston for moving the latter in the cylinder bore to prepressurize fluid in the latter, the block also having therein an outlet port adapted for connection to a load-weighing device, a gauge inlet port and a port interconnecting said outlet and gauge inlet ports and the cylinder bore, a fluid pressure gauge connected to the block in communication with the inlet port, a hollow casing having a chamber therein removably receiving the gauge, and means providing a liquid tight seal for closing said casing chamber.

2. For use with a fluid pressure load weighing device, a combination fluid pressure control and gauge assembly comprising a block having therein a pump cylinder bore slidably receiving a pump piston, adjustable control means on the block engaging the piston for moving the latter in the cylinder bore to prepressurize fluid in the latter, the block also having therein an outlet port adapted for connection to a load weighing device, a gauge inlet port and a port interconnecting said outlet and gauge inlet ports and the cylinder bore, a fluid pressure gauge connected to the block in communication with the inlet port, a hollow casing removably housing the gauge therein, a lens mounted on the casing for viewing the gauge dial and having an opening therethrough, a range indicator hand post extending through the lens opening for rotation therein, and sealing means interposed between the lens opening and post.

3. For use with a fluid pressure load weighing device, a combination fluid pressure control and gauge assembly comprising a block having therein a pump cylinder bore slidably receiving a pump piston, adjustable control means on the block engaging the piston for moving the latter in the cylinder bore to prepressurize fluid in the latter, the block also having therein an outlet port adapted for connection to a load weighing device, a gauge inlet port and a port interconnecting said outlet and gauge inlet ports and the cylinder bore, a fluid pressure gauge connected to the block in communication with the inlet port, a hollow casing removably housing the gauge therein, a first lens mounted on the casing for viewing the gauge dial, an auxiliary lens mounted on the casing for removal independently of the first lens and having an opening therethrough, a range indicator hand post extending through the auxiliary lens opening for rotation therein, and sealing means interposed between the auxiliary lens opening and post.

References Cited in the file of this patent

UNITED STATES PATENTS

| | | |
|---|---|---|
| Re. 24,556 | Eckman | Oct. 28, 1958 |
| 507,009 | Jackson | Oct. 17, 1893 |
| 1,166,719 | Shebol | Jan. 4, 1916 |
| 1,542,284 | Blanco | June 16, 1925 |
| 1,772,188 | Mason | Aug. 5, 1930 |
| 1,877,980 | Schafer | Sept. 20, 1932 |
| 2,331,557 | Lorehn | Oct. 12, 1943 |
| 2,373,552 | Dies | Apr. 10, 1945 |
| 2,615,305 | Jannsen | Oct. 28, 1952 |
| 2,620,177 | Wise | Dec. 2, 1952 |
| 2,653,564 | Benefield | Sept. 29, 1953 |
| 2,666,278 | Matasovic | Jan. 19, 1954 |
| 2,836,977 | Cook | June 3, 1958 |

OTHER REFERENCES

Hydroway Scales (publication), October 1948.